J. MAHEDY.
Sled-Propeller.

No. 205,196.  Patented June 25, 1878.

Witnesses.
J. W. Garner
W. L. O. Haines

Inventor
Jas. Mahedy,
per
J. A. Lehmann,
Atty

UNITED STATES PATENT OFFICE.

JAMES MAHEDY, OF SPERRY, IOWA.

IMPROVEMENT IN SLED-PROPELLERS.

Specification forming part of Letters Patent No. 205,196, dated June 25, 1878; application filed May 23, 1878.

*To all whom it may concern:*

Be it known that I, JAMES MAHEDY, of Sperry, in the county of Des Moines and State of Iowa, have invented certain new and useful Improvements in Propelling Vehicles; and I do hereby declare the following to be a full, clear, and exact description of the invention, such as will enable others skilled in the art to which it pertains to make and use it, reference being had to the accompanying drawings, which form part of this specification.

My invention relates to the propulsion of vehicles.

It consists in making the propelling-levers automatically adjustable in length, so that they will accommodate themselves to all inequalities of surface.

It further consists in the devices whereby the rod upon which the propelling-levers are pivoted is moved backward, thereby causing the levers to move the vehicle backward, all of which will be more fully described hereinafter.

Figure 1:
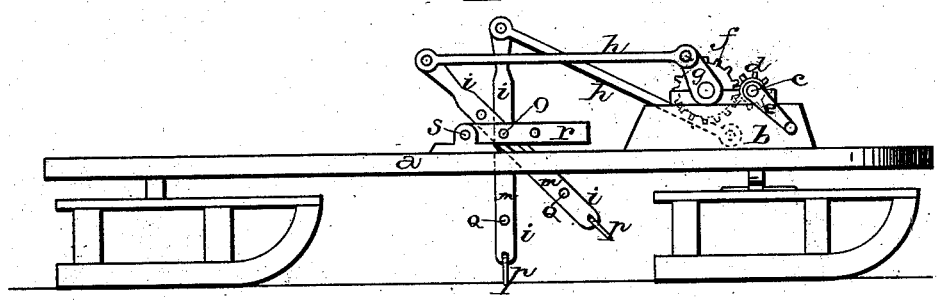
Figure 2:
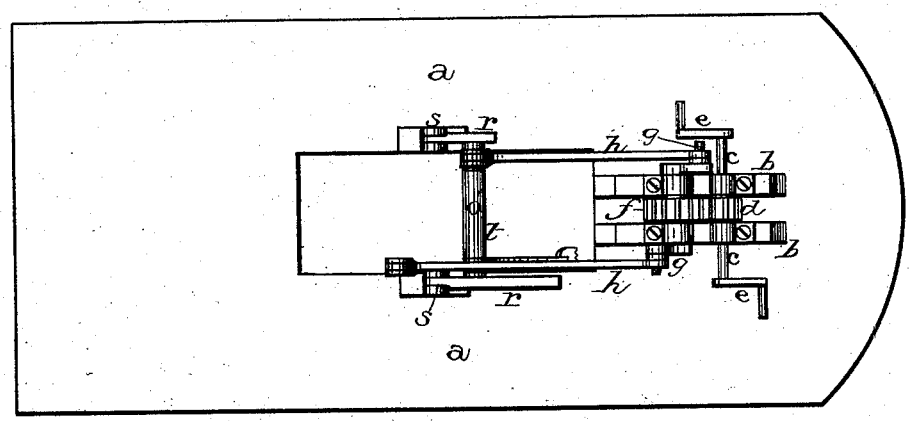
Figure 3:
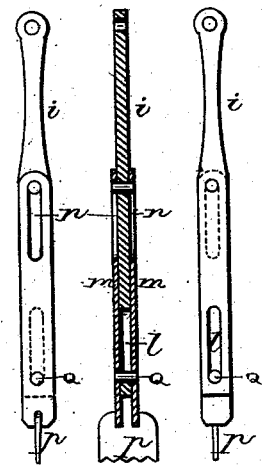

Figure 1 is a side elevation of my invention, partly in section. Fig. 2 is a plan view of the same. Fig. 3 is a detail view.

$a$ represents a vehicle, which is here shown preferably in the form of a sleigh, which has two sets of runners, the front one of which is made movable for steering purposes, while the rear one is immovable. Upon the top of this vehicle is formed a suitable base, $b$, and upon this base is journaled the operating-shaft $c$, which has the pinion $d$ secured to it near its center. This shaft has a crank, $e$, upon each end, for the purpose of receiving power from any suitable motor.

The pinion $d$ meshes with the large spur-wheel $f$, which is placed upon a shaft having the two cranks $g$ formed upon its two ends. To these cranks $g$, which extend in opposite directions, are attached the front ends of the connecting-rods $h$.

The rear ends of the rods $h$ are fastened to the upper ends of the propelling-levers $i$, which are pivoted upon the horizontal rod $o$. The lower ends of the levers $i$ project downward to any suitable extent, and have the slots $l$ made through them. Passed over the sides of these levers are the sleeves $m$, which have the slots $n$ made through their upper ends, so as to allow them a limited play up and down on the rod $o$.

Passing through the sleeves and the slots $l$ in the levers $i$ are the pins Q, which serve to keep the levers and the arms in line with each other.

Upon the lower ends of the sleeves are formed the sharp flat feet $p$, which catch in the snow or ice, and, as the levers are moved alternately back and forth, force the sleigh or other vehicle along.

As the propelling-levers would always operate in the same manner and force the vehicle forward, no matter in which direction the driving-shaft is turned, the rod $o$ is fastened at its ends to the two pivoted levers $r$, so that it can be moved forward and backward of the pivots $s$. When moved forward of the point at which the levers $r$ are pivoted, the propelling-levers $i$ are moved into such a position that when made to operate back and forth the feet $p$ push the vehicle forward. When the rod is moved back of the pivots $s$, the feet catch against the ice and snow, so as to force the vehicle backward.

By having the sleeves and propelling-levers slotted, as described, the sleeves can play freely up and down, so as to accommodate themselves to all sorts of surfaces under all circumstances.

The levers are kept any desired distance apart by means of the sleeve $t$ on the rod $o$.

Having thus described my invention, I claim—

1. The sleeves $m$, having a limited movement, in combination with the propelling-levers $i$, substantially as shown.

2. The combination of the levers $i$, rod $o$, and levers $r$, substantially as described, whereby the motion of the vehicle is reversed.

3. The combination of an operating mechanism, connecting-rods, levers $i$, sleeves $m$, rod $o$, and levers $r$, substantially as set forth.

In testimony that I claim the foregoing I have hereunto set my hand this 14th day of May, 1878.

JAMES MAHEDY.

Witnesses:
 C. W. OWEN,
 H. A. LOWERY.